US006972523B1

(12) United States Patent
Maiw

(10) Patent No.: US 6,972,523 B1
(45) Date of Patent: Dec. 6, 2005

(54) METAL HALIDE LAMP CONTROL DEVICE WITH LINEAR CONTROL POWER TRANSDUCER

(76) Inventor: Roper Maiw, P.O. Box No. 6-57, Junghe, Taipei 235 (TW)

(*) Notice: Subject to any disclaimer, the term of this patent is extended or adjusted under 35 U.S.C. 154(b) by 0 days.

(21) Appl. No.: 11/000,929

(22) Filed: Dec. 2, 2004

(51) Int. Cl.[7] .......................... H05B 37/02; H01K 7/00
(52) U.S. Cl. .......................... 315/76; 315/77; 315/291; 315/307
(58) Field of Search .................... 315/76–78, 117–118, 315/291, 307, 309, 308; H05B 37/02; H01K 7/00

(56) References Cited

U.S. PATENT DOCUMENTS 5,910,713 A * 6/1999 Nishi et al. ................ 315/308
5,952,793 A * 9/1999 Nishi et al. ................ 315/307

* cited by examiner

*Primary Examiner*—Trinh Vo Dinh

(57) ABSTRACT

A metal halide lamp control device with linear control power transducer, having application in an automobile lamp provided with metal halide lamp illumination. A linear control power transducer is utilized to replace a traditional digital control power transducer. The control device includes at least an integrated circuit of the power transducer, wherein the integrated circuit embodies a plurality of control devices and a power supply unit; a starting circuit and the integrated circuit serially acquire power supply to actuate the metal halide lamp; a power regulating circuit which maintains a stable power feedback; and a temperature detector unit which protects against temperature exceeding a specified temperature.

3 Claims, 7 Drawing Sheets

Lighting Tube Illumination: Voltage, Current & Power Waveform Variation

METAL HALIDE LAMP CONTROL DEVICE WITH LINEAR CONTROL POWER TRANSDUCER

BACKGROUND OF THE INVENTION (a) Field of the Invention

The present invention relates to a metal halide lamp control device with linear control power transducer, and having primary application in an automobile lamp having illuminating function, and more particularly to an automobile lamp having a metal halide lamp utilizing a linear control power transducer that replaces a traditional digital control power transducer. A linear integrated circuit effectuates detection of a momentary low voltage direct current and control of a starting circuit, and thus is enabled to completely replace traditional art whereby microprocessor chips implement operation. A large current starting device relay is additionally installed, which can reduce cost of the starting device. Moreover, prior to starting, an extremely low current consumption of approximately 0.002 amps is realized, which assures superior power saving. The present invention not only reduces cost of device configuration and decreases power saving mode control, but also provides superiority of stable power feedback output. Furthermore, a temperature detector unit is additionally installed within an integrated circuit which protects against temperature exceeding a specified temperature.

(b) Description of the Prior Art

Automatic control as applied to actuation of an automobile illuminating lighting tube and related loop control is long-standing. However, fundamental problems of automatic control systems in how to effectuate an arrangement of correlated electronics that realize an improved configuration are more efficient and safer are corresponding ramifications of such problems. Furthermore, after development of the metal halide lamp resulted in same replacing functionality of the original automobile lighting tube, a common objective desired of forerunners of present automobile parts industries was to how to achieve enhancement in effectively reducing costs and effectively stabilizing power and retention of temperature of the metal halide lamp lighting tube.

Because power variation in a power transducer traditionally utilized in the metal halide lamp lighting tube (see FIG. 1) is both large and rapid, thus microprocessors are necessarily utilized to function in coordination with the transducer to effectuate analog to digital transduction and digital to analog transduction. During practical operation of the digital controlled power transducer, the following basic requirements must be provided:

1. Working temperature range—40 degree Celsius to 105 degree Celsius.
2. Provision of in excess of two sets of transducers (analog to digital transduction or digital to analog transduction), and which must exceed 10 bits.
3. Provision of in excess of two sets of 16 bit timers to achieve accurate timekeeping.
4. Provision of ample memory for operation.
5. Provision of sufficient output (input) ports and peripheral functionality.

However, purchase of aforementioned products providing various functionality is not only difficult, but also expensive. Furthermore, a momentary starting current reaches as high as 40A, thus when the automobile lighting tube was replaced with the metal halide lamp, additional installation of a relay control circuit was necessary, and was utilized to avoid damaging a switch, which would otherwise result in increased costs.

With such a control device configured for the metal halide lamp, the following shortcomings in basic structure are still apparent in respect of power feedback (see FIGS. 2, 3 and 4) and temperature protection:

Referring to FIG. 2, which shows waveform displays of the metal halide lamp lighting tube illumination, and depicts that neither utilizing voltage feedback (see FIG. 3) nor current feedback (see FIG. 4) are able to accurately control cycle time variation of lighting tube initial illumination.

High temperature is an unavoidable condition when utilized in the automobile, and usually requires additional installation of a temperature protection device within electrical parts of the automobile, thereby increasing material costs.

A great variety of shortcomings become apparent if further inquiries are made into practicability of such conventional metal halide lamp control devices. Hence, imperfections in conventional art as described indeed results in inability to achieve effective functionality.

SUMMARY OF THE INVENTION

In light of the aforementioned shortcomings, a primary objective of the present invention is to provide a metal halide lamp control device with linear control power transducer, wherein the linear control power transducer replaces a traditional digital control power transducer. A linear integrated circuit effectuates detection of a momentary low voltage direct current flow, and controls a starting switch, and thus is enabled to completely replace traditional art whereby microprocessor chips implement operation. A large current starting device relay is additionally installed, which can reduce cost of a starting device. Moreover, prior to starting, an extremely low current consumption of approximately 0.002 amps is realized, and thus actualizes superiority of power saving.

Another objective of the present invention is to provide the metal halide lamp control device with linear control power transducer that is provided with superiority of stable power feedback output, and a temperature detector unit that is additionally directly configured within the integrated circuit, and utilized to implement measures for protection against excessive temperature.

In order to achieve the aforementioned objectives, the present invention provides the metal halide lamp control device with linear control power transducer, whereby the control device comprises: the integrated circuit of the power transducer, wherein the integrated circuit embodies a plurality of control devices and a power supply unit; a starting circuit, which in conjunction with the integrated circuit serially acquire power supply to actuate the metal halide lamp; a power regulating circuit, which maintains power feedback; the temperature detector unit, which is utilized to implement measures for protection against excessive temperature.

Primary function of the integrated circuit is to replace the traditional control power transducer, whereby the integrated circuit detects whether or not there is a momentary low voltage direct current by means of the linear integrated circuit, thereafter transmitting an analog signal that directly controls an starting switch, thereby replacing a set of microprocessor chips as utilized in a conventional configuration for processing operations. A relay providing a high current starting device is additionally installed, which apart from substantially reducing costs of manufacturing components, moreover, provides a power saving function.

The power regulating circuit primarily effectuates a feedback after power detection, and when a deviation occurs in power of the lighting tube, notification is automatically transmitted to the regulating circuit to implement regulation in order to maintain a stable power output feedback of the lighting tube power within an appropriate range.

In addition, the temperature detector unit is directly disposed on the integrated circuit, thereby realizing unnecessity to additionally install a temperature protection device within automobile electrical parts, which would increase material costs. The temperature detector unit operates in conjunction with the integrated circuit and detects whether or not ambient temperature has surpassed a specified temperature, such that when the temperature does exceed the specified temperature, the temperature detector unit transmits a signal to notify the integrated circuit to cease operation.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 5:
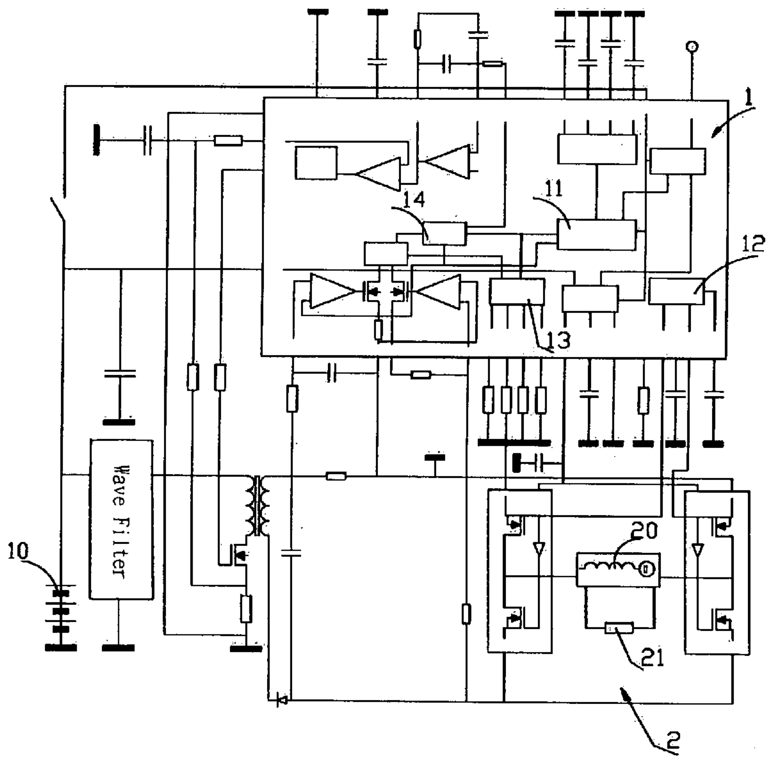
FIG. 5 shows a logic circuit diagram according to the present invention.

Referring to FIG. 5, a metal halide lamp control device with linear control power transducer of the present invention is provided with a power transducer integrated circuit 1 and a starting circuit 2. The integrated circuit 1 of the power transducer embodies a power supply unit 10 and a control unit 11. The power supply unit 10 is electrically connected to the control unit 11, and utilized to provide electricity to the control unit 11, which thereby acquires electric supply that enables effectuating process control. After acquiring the electric power provided by the power supply unit 10, the control unit 11 directs operation towards a starting circuit 2 to effectuate circuits of a plurality of correlated control devices. The operating circuits embody a lighting tube frequency control unit 12 and a power rate control unit 13. The lighting tube frequency control unit 12 and the power rate control unit 13 modulates an appropriate frequency to function in coordination with various factory branded metal halide lamps. A feedback setting 14 effectuates functionality whereby after detecting the power the feedback setting 14 provides feedback and therewith achieves stable power.

After the control unit 11 acquires electric power supplied by the power supply unit 10, and thus controlling the starting circuit 2, the starting circuit 2 and the integrated circuit of the power transducer 1 serially acquire power supply, and after a starter 20 has acquired power supply, a metal halide lamp 21 is thereby actuated, which thus completes starting flow process.

Figure 1:
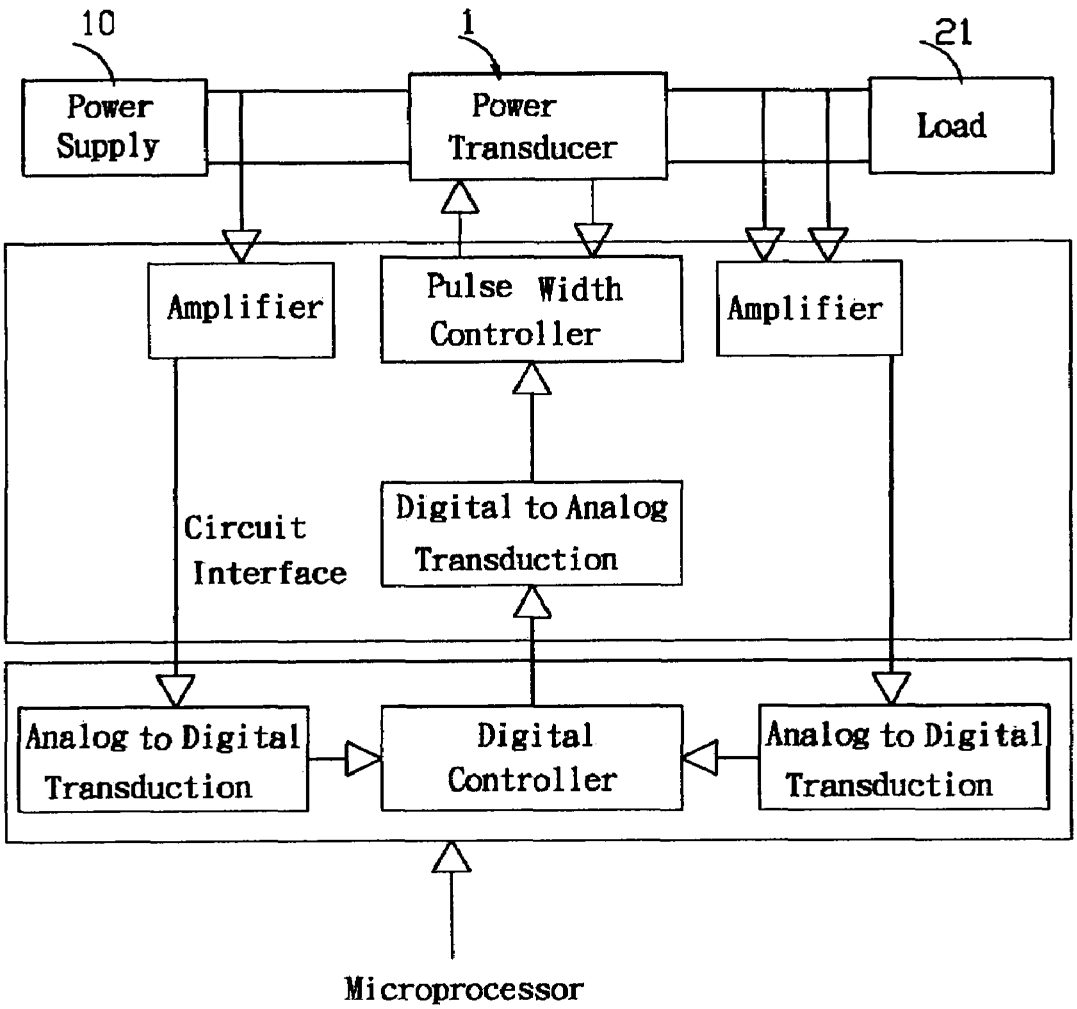
FIG. 1 shows a conventional logic circuit diagram as applied in a metal halide lamp lighting tube power transducer.

Primary function of the integrated circuit 1 of the power transducer is to detect whether or not there is a momentary low voltage direct current flow by means of a linear integrated circuit, thereafter transmitting an analog signal that directly controls a starting switch, which thus enables replacing a set of microprocessor chips as utilized to implement operation in a conventional configuration (as depicted in FIG. 1). A relay providing a large current starting device is additionally installed. Because power variation of such is large and rapid, therefore microprocessors necessarily operate in coordination with the transducer that effectuates analog to digital transduction and digital to analog transduction.

Figure 2:
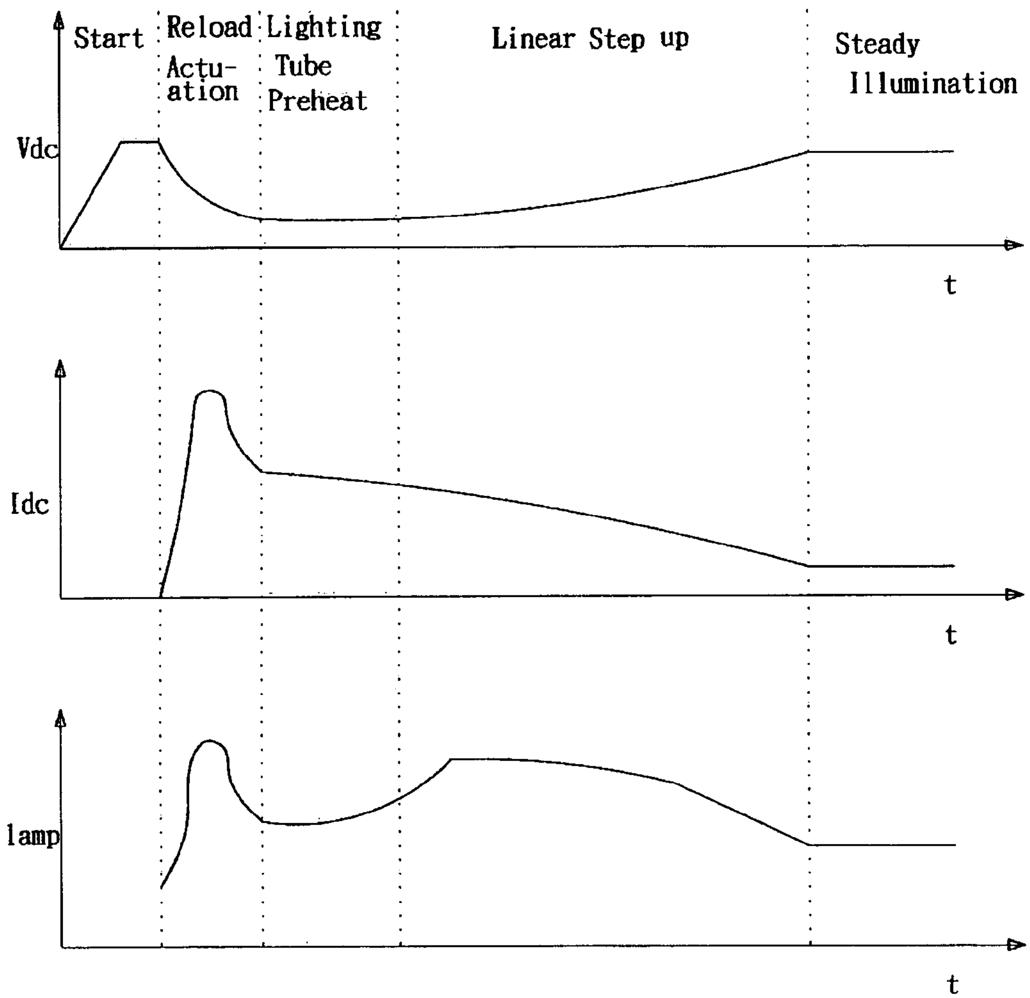
FIG. 2 shows a waveform display comparison chart of metal halide lamp lighting tube illumination.
Figure 3:
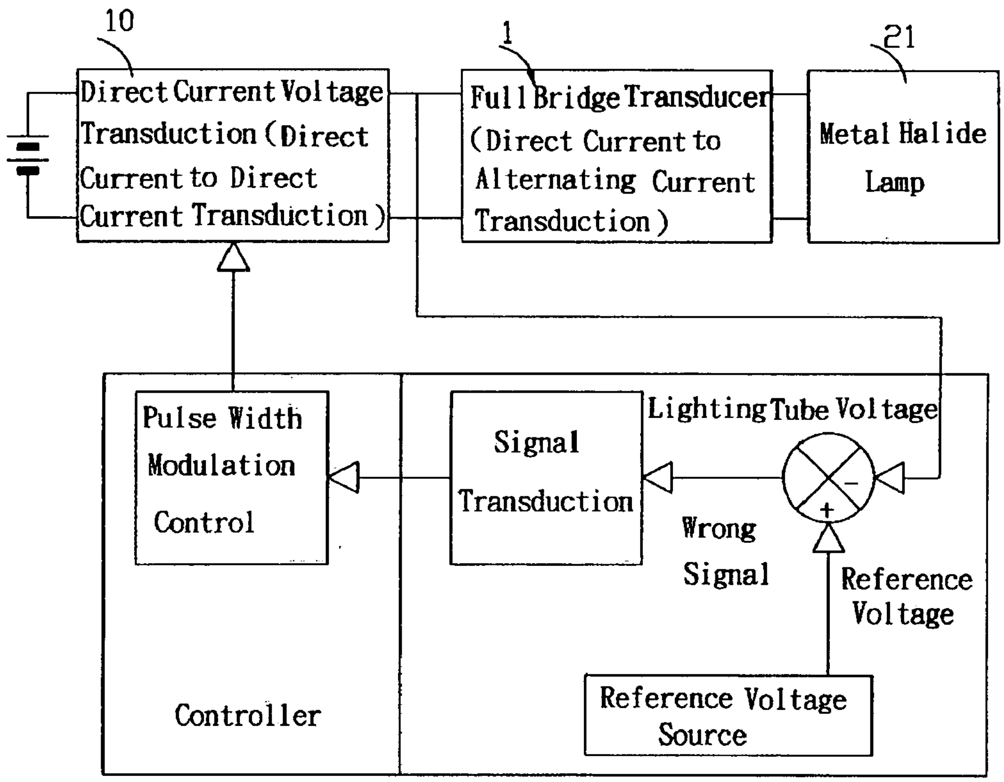
FIG. 3 shows a conventional logic circuit diagram as applied in a metal halide lamp lighting tube voltage feedback.
Figure 4:
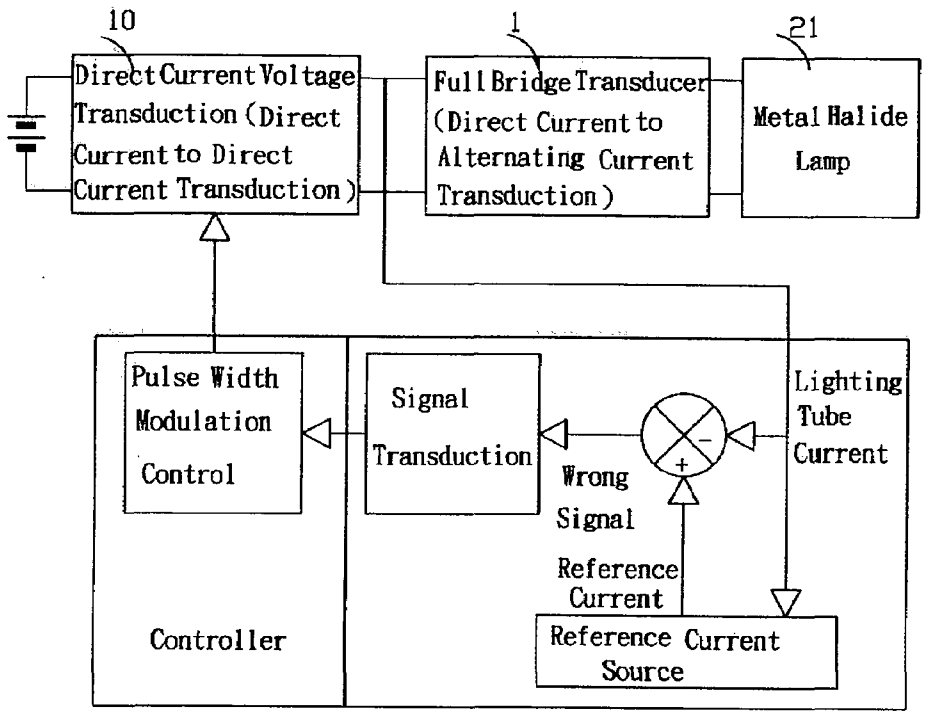
FIG. 4 shows a conventional logic circuit diagram as applied in a metal halide lamp lighting tube current feedback.
Figure 6:
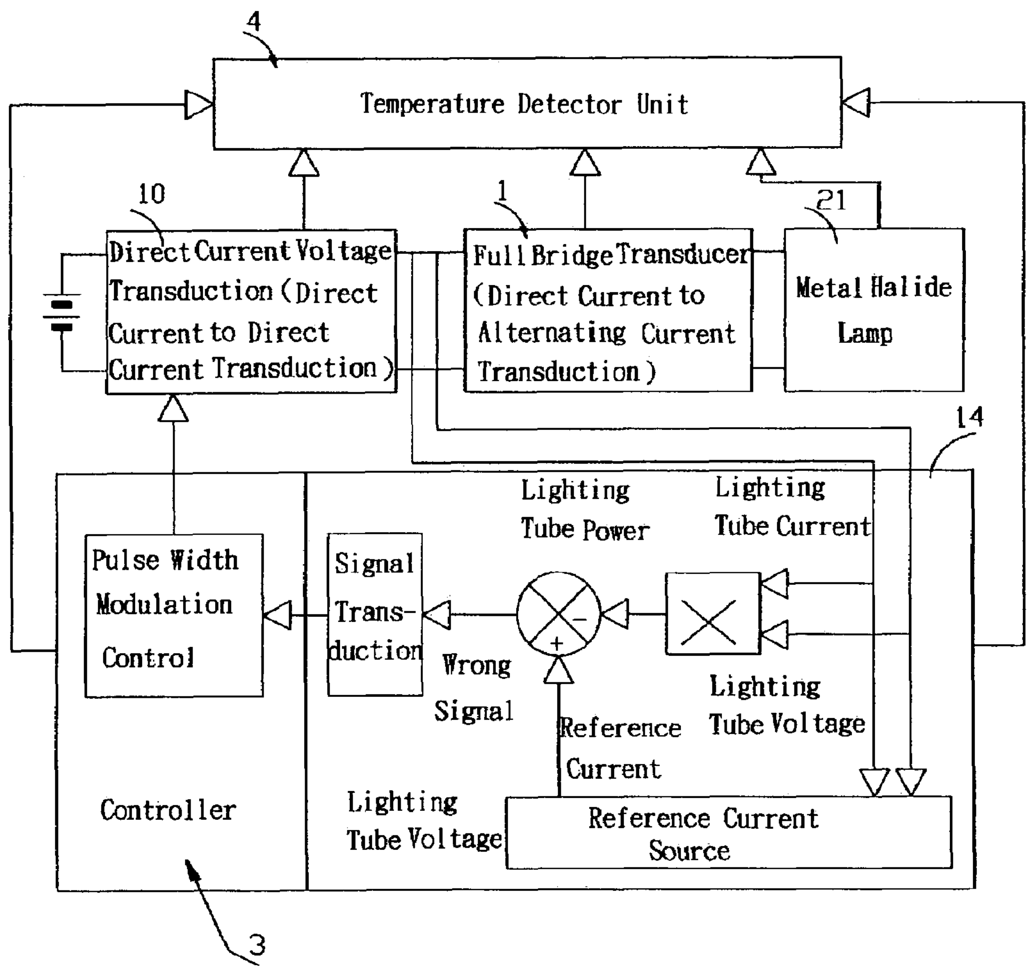
FIG. 6 shows a logic circuit diagram of a power feedback according to the present invention.

In conjunction with the aforesaid figures, and further referring to FIG. 6, a feedback setting 14 of the metal halide lamp control device with linear control power transducer of the present invention functions in coordination with a power regulating circuit 3, which primarily effectuates a feedback after power detection by means of the feedback setting 14. When a deviation occurs in the power of the lighting tube, notification is automatically transmitted to the regulating circuit 3 to implement regulation in order to maintain a stable power output feedback of the lighting tube power within an appropriate range. Referring to FIG. 2, which shows waveform displays of the metal halide lamp lighting tube illumination, which depicts that neither utilizing voltage feedback (see FIG. 3) nor current feedback (see FIG. 4) are able to accurately control cycle time variation of lighting tube initial illumination.

Only a power feedback (see FIG. 6) can achieve accurate control of the cycle time variation. Because electric circuits are generally minute and complicated, application of such electric circuits is infrequent in conventional art, and presently, application within metal halide lamp products is realized by means of assemblage of the integrated circuit 1 and the feedback setting 14 of the power transducer.

Figure 7:
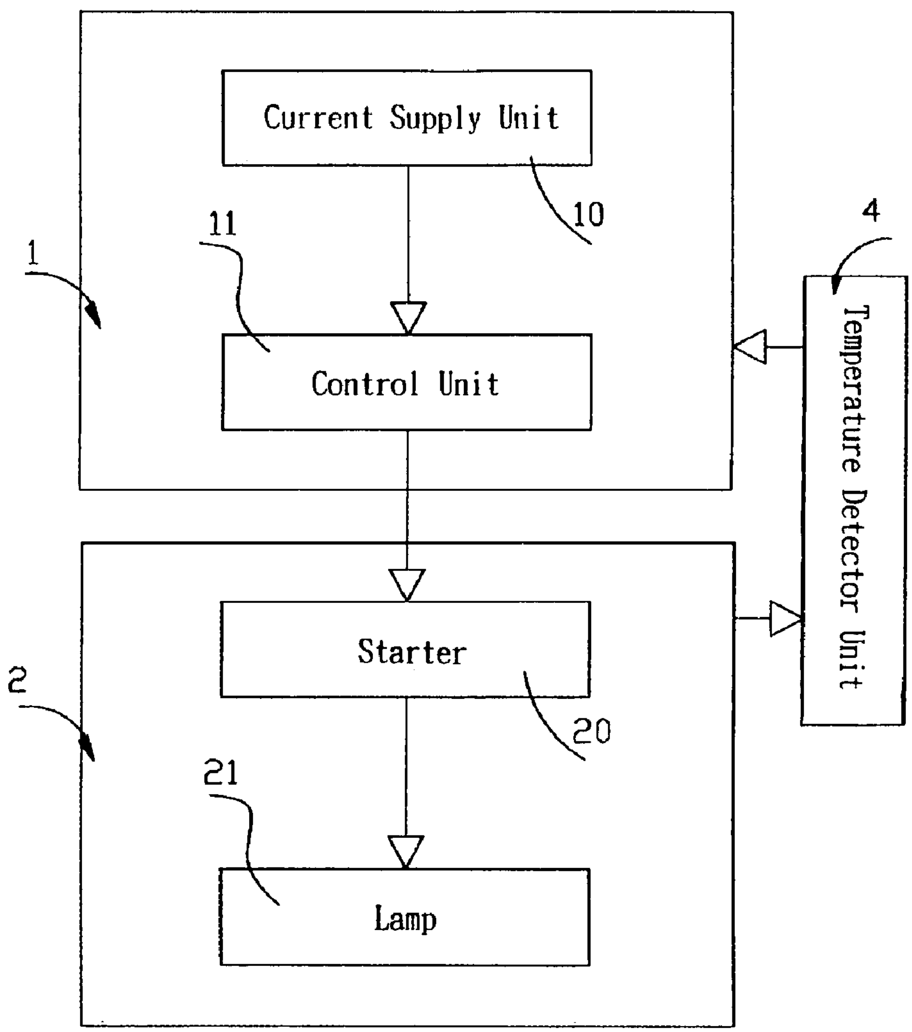
FIG. 7 shows a flow chart according to the present invention.

In conjunction with the foregoing figures, and further referring to FIG. 7, the power transducer integrated circuit 1 of the linear control power transducer of the present invention functions in coordination with a temperature detector unit 4. The temperature detector unit 4 is directly disposed on the integrated circuit 1 of the power transducer, thereby realizing unnecessity to additionally install a temperature protection device within automobile electrical parts, which would increase material costs. The temperature detector unit 4 operates in conjunction with the integrated circuit 1, and detects whether or not ambient temperature has surpassed a specified temperature, such that when the temperature does exceed the specified temperature, the temperature detector unit 4 transmits a signal to notify the integrated circuit 1 to cease operation.

In conclusion, the patent application of the present invention not only proffers a spirit of innovation and conceptual originality, moreover, provides elements which are unprecedented and an advancement in prior art, and more particularly is able to reduce complicacy of circuit design, provides omniirange accommodation for actuation of plus voltage and minus voltage applicable to all factory branded metal halide lamp control devices, is easily implemented and achieves anticipated effectiveness, and thus eliminates shortcomings existent in conventional art and bestows extensive practicability. Hence, summarizing, the present invention is not only provided with essential elements as required for a new innovative patent model, but also affords double value of advancement and practicability.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A metal halide lamp control device with linear control power transducer comprising:

an integrated circuit of a power transducer, the integrated circuit comprises a control unit and a power supply unit, and a plurality of control devices, wherein the power supply unit is electrically connected to the control unit, and utilized to provide electricity to the control unit, which thereby acquires an electric power through electric supply that enables effectuating process control, after acquiring the electric power provided by the power supply unit the control unit directs operation towards a starting circuit to effectuate circuits of a plurality of correlated control devices;

the starting circuit, the starting circuit and the integrated circuit serially acquire power supply, and after a starter has acquired power supply, a metal halide lamp is thereby actuated;

a power regulating circuit functioning in integration with a feedback setting of the integrated circuit of the power transducer is enabled for application in a metal halide lamp illuminating circuit, thereby maintaining a stable power feedback;

a temperature detector unit directly disposed on the integrated circuit, and which operates in conjunction with the integrated circuit to detect whether or not ambient temperature generated by aforesaid components including the integrated circuit and the power transducter has surpassed a specified temperature, such that when the temperature does exceed the specified temperature the temperature detector unit transmits a signal to notify the integrated circuit to cease operation.

2. The metal halide lamp control device with linear control power transducer according to claim 1, wherein operating circuits of the plurality of control devices are provided with a lighting tube frequency control unit and a power rate control unit, moreover, the lighting tube frequency control unit and the power rate control unit can modulate an appropriate frequency to function in coordination with various factory branded metal halide lamps.

3. The metal halide lamp control device with linear control power transducer according to claim 1, wherein the operating circuits of the plurality of control devices are provided with the feedback setting, which effectuates functionality whereby after detecting power the feedback setting provides feedback and therewith achieves stable power.

* * * * *